May 25, 1926.
G. G. ENGBERG
1,585,968
ANTISKID DEVICE
Filed August 6, 1923
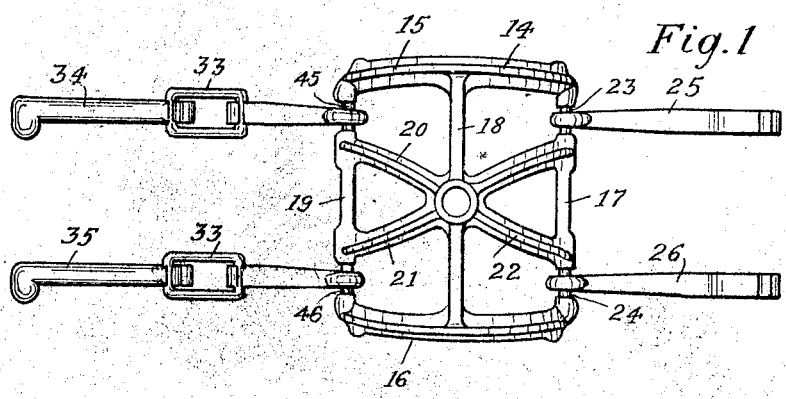
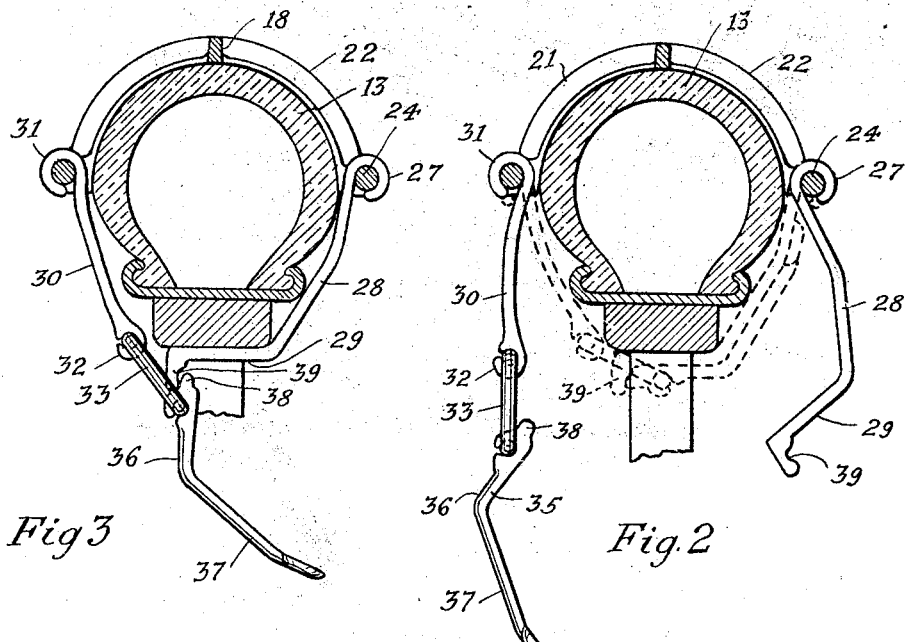
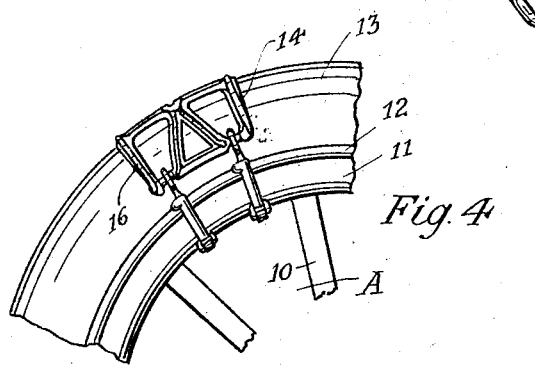
Inventor:
Gustave G. Engberg,
By: Fischer Lagaard
his Attorneys.

Patented May 25, 1926.

1,585,968

UNITED STATES PATENT OFFICE.

GUSTAVE G. ENGBERG, OF ST. PAUL, MINNESOTA.

ANTISKID DEVICE.

Application filed August 6, 1923. Serial No. 655,867.

My invention relates to anti-skid devices and has for its object to provide a device which is adapted to be readily attached to a vehicle tire to prevent the same from skidding and to give the wheel suitable traction.

Another object of the invention is to provide a device having a curved contour adapted to fit over the tread of the tire and to maintain its shape when mounted thereon so as to provide a substantial gripping surface upon the ground.

Another object is to provide a pair of clamping members pivotally connected to said first named member which are adapted to rigidly clamp the device securely in place upon the tire.

Another object resides in forming one of said clamping members with an angular portion adapted to fit over the side of the tire and rim and to lie flat upon the felly of the wheel and to provide the other of the said clamping members with an operating lever connected thereto by means of a wire link, which operating member is adapted to engage said angular member to clamp the device in place.

A still further object of the invention resides in providing a number of diagonal and parallel bars on said first named member having engaging surfaces adapted to engage the ground to prevent the skidding of the vehicle tire and to secure traction.

A still further object resides in constructing a device so that the same may be made of malleable castings, thereby greatly reducing the cost of the invention.

Further objects and advantages of my invention reside in the detailed construction of the same as brought out in the following specification and claim.

In the drawings illustrating my invention in one form:

Figure 1 is a plan view of the device prior to the attachment of the same to the vehicle tire.

Figure 2 is a sectional view of the tire showing the invention applied thereto.

Figure 3 is a view similar to Figure 2 showing the clamping members engaging one another and about to be closed to clamp the device in place.

Figure 4 is a side elevational view of a portion of the vehicle wheel and tire showing my invention attached thereto and drawn to a reduced scale.

In the use of anti-skid devices for vehicle tires considerable difficulty has been found in that it frequently becomes necessary to jack up the rear axle of the vehicle in order to attach the anti-skid device thereto. With my invention this difficulty is overcome in providing a number of independent units which may be individually attached to the tire at the required intervals without necessitating the jacking up of the hind wheel.

In addition the device is quickly and securely attached to the tire so that once the same has been placed upon the tire, said device remains securely in position.

In the drawings I have shown a portion of a vehicle wheel A having spokes 10, a felly 11 and a rim 12. Upon the rim 12 is attached a pneumatic tire 13 of ordinary construction.

My invention comprises primarily a ground engaging member 14 which consists of two arcuate bars 15 and 16 adapted to fit around the circumference of the tire 12, which bars are connected together by means of three longitudinal bars 17, 18 and 19, which are also slightly curved to fit the contour of the tire. Between the bars 17, 18 and 19 are positioned transverse bars 20 and 21 which are positioned diagonally relative to the device and which intersect at the center of the same as is clearly shown in Figure 1. Upon the bars 15, 16, 20 and 21 are formed upwardly extending ribs 22 which are adapted to engage the ground and which provide anti-friction means for preventing the vehicle wheel from skidding or slipping upon the ground and giving suitable traction.

For attaching the device to the wheel proper, the bars 17 and 19 which lie along the sides of the tire are formed with four cylindrical shanks 23, 24, 45 and 46, which are positioned between the respective cross bars 15, 20, 21 and 16. To the shanks 23 and 24 are attached two angularly formed clamp members 25 and 26 which are constructed with hooked portions 27 adapted to be hooked about the shanks 23 and 24 which members have side portions 28 adapted to lie along the side of the felly 11 and the tire 13 and which have angularly disposed portions 29 adapted to rest upon and be seated upon the inner surface of the felly 11 as clearly shown in Figure 2. To the other shanks 45 and 46 are pivotally connected arms 30 which have hooked portions 31 similar to the hooked portions 27 adapted to pass around the said shanks. These arms are further provided at their ends with other hooked portions 32 to which are pivoted wire links 33 shown in detail Figure 1. At the other ends of the links 33 are pivoted by means of hooks two levers 34 and 35, which levers are formed with a portion 36 adapted to rest upon the portion 29 of the members 25 and 26 and are further provided with handles 37 issuing outwardly therefrom which handles, when the device is clamped upon the tire, follow along the portions 28 of the said members 25 and 26 as clearly shown in dotted lines in Figure 2. At the extreme ends of the portions 36 of levers 34 and 35 are formed lugs 38 which are adapted to engage sockets 39 formed on the extreme ends of the portions 29 of the members 25 and 26.

In applying the device to the vehicle tire, the member 14 is placed over the tire as shown in full lines in Figure 2 with the portions pivoted thereto hanging downwardly along the sides of the tire. Members 25 and 26 are then swung inwardly to take the position shown in Figure 3 and the levers 34 and 35 manipulated to bring lugs 38 into co-operation with the sockets 39 as shown in this figure. By pressing the handles 37 of these levers inwardly, the said levers are caused to take the position shown in dotted lines in Figure 2. It will be noted that, when so closed, the wire links 33 assume an angular position relative to the portions 28 of members 25 and 26 which tends to hold the said levers 34 and 36 in place. By this means, when once the device has been clamped in place, the same is securely held from loosening or removal until the handles 37 are again moved upwardly to release the device.

In the construction of the device, the parts are preferably cast of malleable iron with the hooks 27, 31 and 32 cast open. In assembling the parts, these hooks are closed by squeezing the same together which completes the operation required for this purpose. It can readily be seen in this manner an exceedingly simple and economical device to manufacture is secured, which, at the same time, when once applied to the tire firmly remains in place without the chance of accidental removal. By forming the ground engaging member 14 of one piece arranged with the transverse and diagonal bars or ribs, a device is provided which effectively engages the ground to secure the desired friction for preventing skidding or giving sufficient traction to the vehicle wheel when desired.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claim:

I claim:

A rigid anti-skid device comprising a ground engaging member comprising a number of transverse arcuate bars, three longitudinal bars connecting said transverse arcuate bars at their centers and ends, and a number of diagonal bars connecting said longitudinal bars.

GUSTAVE G. ENGBERG.